US012640827B2

(12) United States Patent
Saptharishi et al.

(10) Patent No.: US 12,640,827 B2
(45) Date of Patent: May 26, 2026

(54) SYSTEM AND METHOD FOR DETECTING AND ALERTING ABOUT RADIO COMMUNICATION ANOMALIES

(71) Applicant: HONEYWELL INTERNATIONAL INC., Charlotte, NC (US)

(72) Inventors: Sivaraman Saptharishi, Bangalore (IN); Vasantha Paulraj, Bangalore (IN); Gobinathan Baladhandapani, Bangalore (IN); Mohammed Ibrahim Mohideen, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 381 days.

(21) Appl. No.: 18/346,397

(22) Filed: Jul. 3, 2023

(65) Prior Publication Data

US 2024/0388371 A1 Nov. 21, 2024

(30) Foreign Application Priority Data

May 19, 2023 (IN) .............................. 202311035175

(51) Int. Cl.
H04B 17/345 (2015.01)
G08B 21/18 (2006.01)

(52) U.S. Cl.
CPC ........... H04B 17/345 (2015.01); G08B 21/18 (2013.01)

(58) Field of Classification Search
CPC .............................. H04B 17/345; G08B 21/18
USPC ....................................................... 455/67.7
See application file for complete search history.

(56) References Cited

U.S. PATENT DOCUMENTS

| | | | |
|---|---|---|---|
| 4,335,468 A | 6/1982 | Foster et al. | |
| 6,308,052 B1 | 10/2001 | Jamali et al. | |
| 6,607,136 B1* | 8/2003 | Atsmon ................. | G06Q 20/40 |
| | | | 235/487 |
| 7,286,980 B2 | 10/2007 | Wang et al. | |
| 7,734,312 B2 | 6/2010 | Hosono et al. | |
| 2014/0297293 A1* | 10/2014 | Heuberger ............. | G10L 25/69 |
| | | | 704/500 |

(Continued)

FOREIGN PATENT DOCUMENTS

| | | |
|---|---|---|
| CN | 107665711 A | 2/2018 |
| CN | 107749298 A | 3/2018 |
| EP | 2556593 B1 | 5/2014 |

*Primary Examiner* — Eugene Yun
(74) *Attorney, Agent, or Firm* — Ingrassia Fisher & Lorenz LLP

(57) ABSTRACT

A system and method to detect and alert about radio communication anomalies includes receiving, in a processing system, a first audio communication that is audio from a demodulated radio communication, and receiving, in the processing system, a second audio communication that is audio from a vehicle operator. The first audio communication is processed, in the processing system, to determine, from at least one audio characteristic, when the first audio communication is characteristic of a first radio communication anomaly. The first audio communication and the second audio communication are processed, in the processing system, to determine when the first audio communication and the second audio communication are causing a second radio communication anomaly. The vehicle operator is alerted, via an alert generator, when it is determined that either the first radio communication anomaly or the second radio communication anomaly occur.

17 Claims, 4 Drawing Sheets

(56) References Cited

U.S. PATENT DOCUMENTS

| | | | |
|---|---|---|---|
| 2016/0155435 | A1 | 6/2016 | Mohideen |
| 2020/0403715 | A1 | 12/2020 | Kito et al. |
| 2022/0115020 | A1 | 4/2022 | Bradley et al. |
| 2025/0008284 | A1* | 1/2025 | Li .......................... G10L 25/60 |

* cited by examiner

SYSTEM AND METHOD FOR DETECTING AND ALERTING ABOUT RADIO COMMUNICATION ANOMALIES

CROSS REFERENCE TO RELATED APPLICATION

The present application claims benefit of prior filed India Provisional Patent Application No. 20/2311035175, filed May 19, 2023, which is hereby incorporated by reference herein in its entirety.

TECHNICAL FIELD

The present disclosure generally relates to radio communications and, more particularly, to systems and methods for detecting and alerting about radio communication anomalies.

BACKGROUND

Proper radio communication between aircraft and air traffic control, as well as between aircraft, is an important contributor to proper flight operations. Unfortunately, there are times when certain radio communication anomalies can occur. In most instances, these anomalies occur when two or more radio communications occur simultaneously on the same communication frequency. This can result in all or part of a message being partially or fully blocked, and thus not heard by the intended recipient, and/or being heard as a buzzing sound or as a squeal.

Given the steady growth of air traffic worldwide, there is a corresponding increase in the incidence of simultaneous radio transmissions. Such occurrences are highly undesirable, especially when these go undetected.

Hence, there is a need for a system and method of detecting overlapping radio transmissions and alerting pilots that such transmissions have occurred. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method to detect and alert about radio communication anomalies includes receiving, in a processing system, a first audio communication that is audio from a demodulated radio communication, and receiving, in the processing system, a second audio communication that is audio from a vehicle operator. The first audio communication is processed, in the processing system, to determine, from at least one audio characteristic, when the first audio communication is characteristic of a first radio communication anomaly. The first audio communication and the second audio communication are processed, in the processing system, to determine when the first audio communication and the second audio communication are causing a second radio communication anomaly. The vehicle operator is alerted, via an alert generator, when it is determined that either the first radio communication anomaly or the second radio communication anomaly occur.

In another embodiment, system for detecting and alerting about radio communication anomalies includes an alert generator and a processing system. The alert generator is coupled to receive an alert signal and is configured, upon receipt of the alert signal, to generate an alert. The processing system is in operable communication with the alert generator. The processing system is configured, by programming instructions, to: receive a first audio communication that is audio from a demodulated radio communication; receive a second audio communication that is audio from a vehicle operator; process the first audio communication to determine, from at least one audio characteristic, when the first audio communication is characteristic of a first radio communication anomaly; process the first audio communication and the second audio communication to determine when the first audio communication and the second audio communication are causing a second radio communication anomaly; and generate and supply the alert signal to the alert generator when it is determined that either the first radio communication anomaly or the second radio communication anomaly occur.

In yet another embodiment, a system for detecting and alerting about radio communication anomalies includes an alert generator, a radio receiver, a microphone, and a processing system. The alert generator is coupled to receive an alert signal and is configured, upon receipt of the alert signal, to generate an alert. The radio receiver is configured to receive and demodulate a transmitted radio communication to thereby supply a first audio communication. The microphone is configured to receive audio from a vehicle operator and supply a second audio communication. The processing system is in operable communication with the alert generator, the radio receive, and the microphone. The processing system is configured, by programming instructions, to: receive the first audio communication; receive the second audio communication; process the first audio communication to determine, from at least one audio characteristic, when the first audio communication is characteristic of a first radio communication anomaly; process the first audio communication and the second audio communication to determine when the first audio communication and the second audio communication are causing a second radio communication anomaly; and generate and supply the alert signal to the alert generator when it is determined that either the first radio communication anomaly or the second radio communication anomaly occur.

Furthermore, other desirable features and characteristics of the radio communication anomaly detection and alerting system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
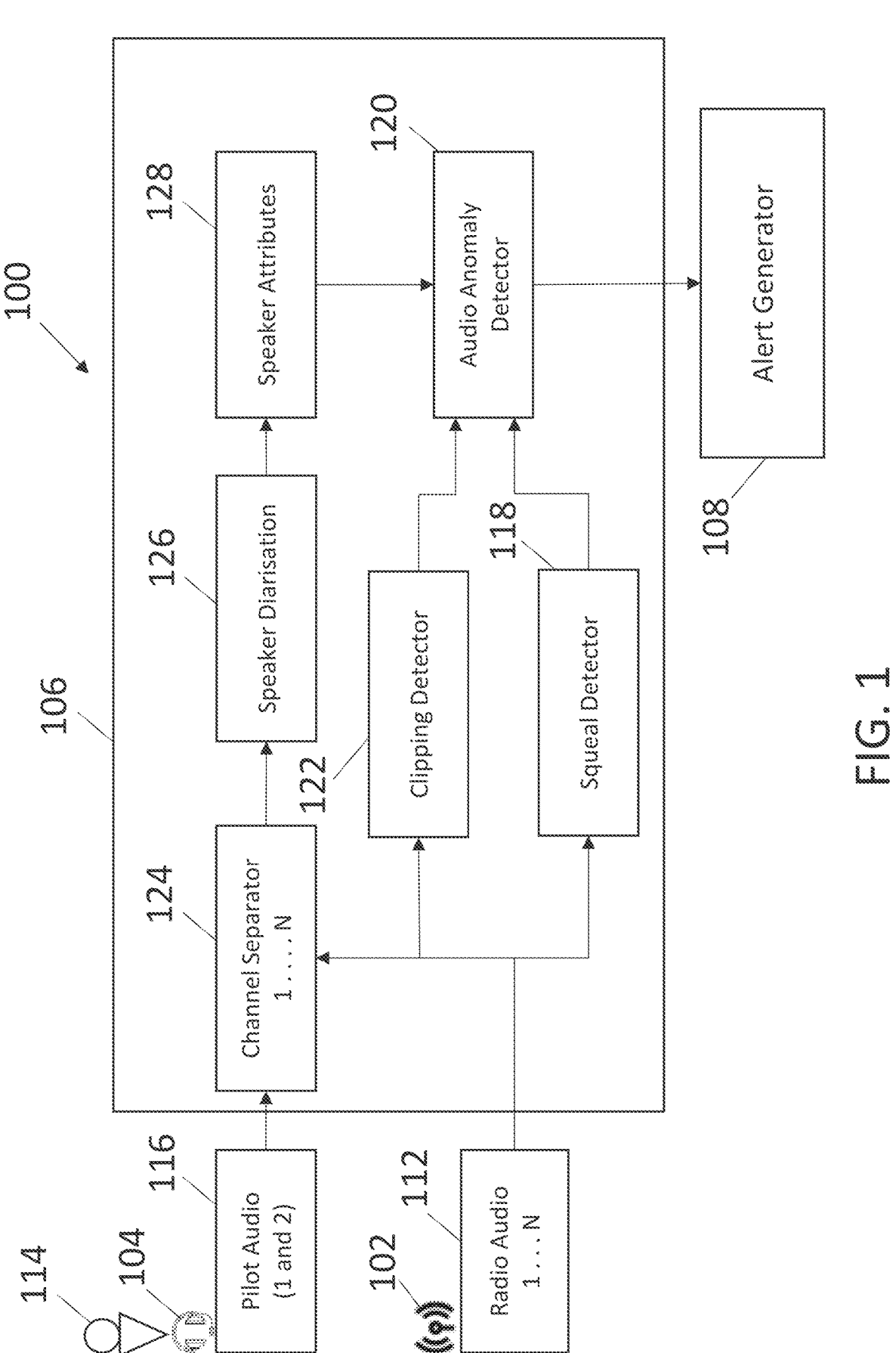
FIG. 1 depicts a functional block diagram of one embodiment of a system for detecting and alerting about radio communication anomalies.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring to a system 100 for detecting and alerting about radio communication anomalies is depicted. The depicted system 100 includes a radio receiver 102, a microphone 104, a processing system 106, and an alert generator 108. The radio receiver 102 is configured, using known technology, to receive and demodulate a transmitted radio communication to thereby supply a first audio communication 112. The radio receiver 102 may be implemented using any one of numerous known receivers that are configured to receive and demodulate radio communications transmitted from a remote location, such as another vehicle (e.g., another aircraft) and/or a control station (e.g., air traffic control). Regardless of how it is specifically implemented, the first audio communication 112 may be supplied to a non-illustrated speaker to thereby generate an audible communication. In the depicted embodiment, the first audio communication 112 is also supplied to the processing system 106.

The microphone 104 is configured, using known technology, to receive audio supplied from a vehicle operator 114 (e.g., a pilot) and to supply a second audio communication 116. The microphone 104 may be implemented using any one of numerous known devices that are configured to receive an audible communication from a human and, in response, generate the second audio communication 116. Regardless of how it is specifically implemented, the second audio communication 116 may be supplied to a non-illustrated radio transmitter, which modulates and transmits the second audio communication 116 to another vehicle (e.g., another aircraft) and/or a control station (e.g., air traffic control). In the depicted embodiment, the second audio communication 116 is also supplied to the processing system 106.

The processing system 106 is in operable communication with the radio receiver 102, the microphone 104, and the alert generator 108. The processing system 106 may include one or more processors and computer-readable storage devices or media encoded with programming instructions for configuring the processing system 106. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the one or more processors.

The processing system 106 is configured, by the programming instructions, to receive the first audio communication 112 from the radio receiver 102, and to receive the second audio communication 116 from the microphone 104. The processing system 106 is further configured to process the first audio communication 112 to determine, from at least one audio characteristic, when the first audio communication 112 is characteristic of a first radio communication anomaly. The processing system 106 is additionally configured to process both the first audio communication 112 and the second audio communication 116 to determine when the first audio communication 112 and the second audio communication 116 are causing a second radio communication anomaly.

It will be appreciated that the first and second radio communication anomalies may vary. In the depicted embodiment, however, the first radio communication anomaly is when the first audio communication 112 and second audio communication 116 overlap in a manner that completely blocks further processing, by the radio receiver 102, of the first audio communication 112, and thus no communication is audible to the vehicle operator 114. The second radio communication anomaly is when the first audio communication 112 and the second audio communication 116 overlap in a manner that partially blocks further processing, by the radio receiver 102, of the first audio communication 112.

As noted above, the processing system 106 determines when the first audio communication 112 is characteristic of the first radio communication anomaly from at least one audio characteristic of the first radio communication 112. In the depicted embodiment, the at least one audio characteristic includes a power spectral density of the first audio communication 112, and the processing system 106, via the programming instructions, implements what is referred to herein as a squeal detector module 118. The squeal detector module 118 implements a process to determine when the first radio communication anomaly has occurred and, when it has occurred, sends a signal to, what is referred to herein as, an audio anomaly detector module 120. The audio anomaly detector module 120, which is implemented via the programming instructions, processes this signal to generate and supply an appropriate alert signal to the alert generator 108. The process that the squeal detector module 118 implements is described in more detail further below.

As was also noted above, the processing system 106 processes both the first audio communication 112 and the second audio communication 116 to determine when the first audio communication 112 and the second audio communication 116 are causing the second radio communication anomaly. To do so, the processing system 106, via the programming instructions, implements what are referred to herein as a clipping detector module 122, a channel separator module 124, a speaker diarisation module 126, and a speaker attributes module 128.

The clipping detector module 122 analyzes the first audio communication 112 to determine when the first audio communication 112 is clipped. To do so, the clipping detector module 122 implements any one of numerous known clipping detection techniques. As FIG. 1 further depicts, when the clipping detector module 122 determines that the first audio communication 112 is clipped, it sends an appropriate signal to the audio anomaly detector module 120.

The channel separator module 124 receives the first and second audio communications 112, 116, separates the audio communications 112, 116 into separate channels, and supplies each to the speaker diarisation module 126. The speaker diarisation module 126, using any one of numerous known techniques, partitions the first and second audio communications 112, 116 into homogeneous segments to identify, using the speaker attributes module 128, the speaker attributes contained within the first and second audio communications 112, 116. The speaker attributes module 128 also implements its functionality using any one of numerous known techniques. The speaker attributes module 128 supplies the identified speaker attributes to the audio anomaly detector module 120.

The audio anomaly detector module 120 determines receives and processes the signals supplied from the clipping detector module 122 and the speaker attributes from the speaker attributes module 128 and determines that the second radio communication anomaly has occurred when (i) the first audio communication is clipped and (ii) the speaker attributes are identified. If the second radio communication anomaly has occurred, the audio anomaly detector module 120 generates and supplies an appropriate alert signal to the alert generator 108.

The alert generator 108 is coupled to receive the alert signal supplied from the audio anomaly detector module 120 and is configured, upon receipt of the alert signal, to generate an alert. The alert signal supplied by the audio anomaly detector module 120 will depend upon which radio communication anomaly—the first radio communication anomaly or the second radio communication anomaly—is occurring. It will be appreciated that the alert generator 108 may be variously implemented and may be configured to generate various types of alerts, including an audible alert, a visual alert, a haptic alert, or any combination thereof.

Figure 2:
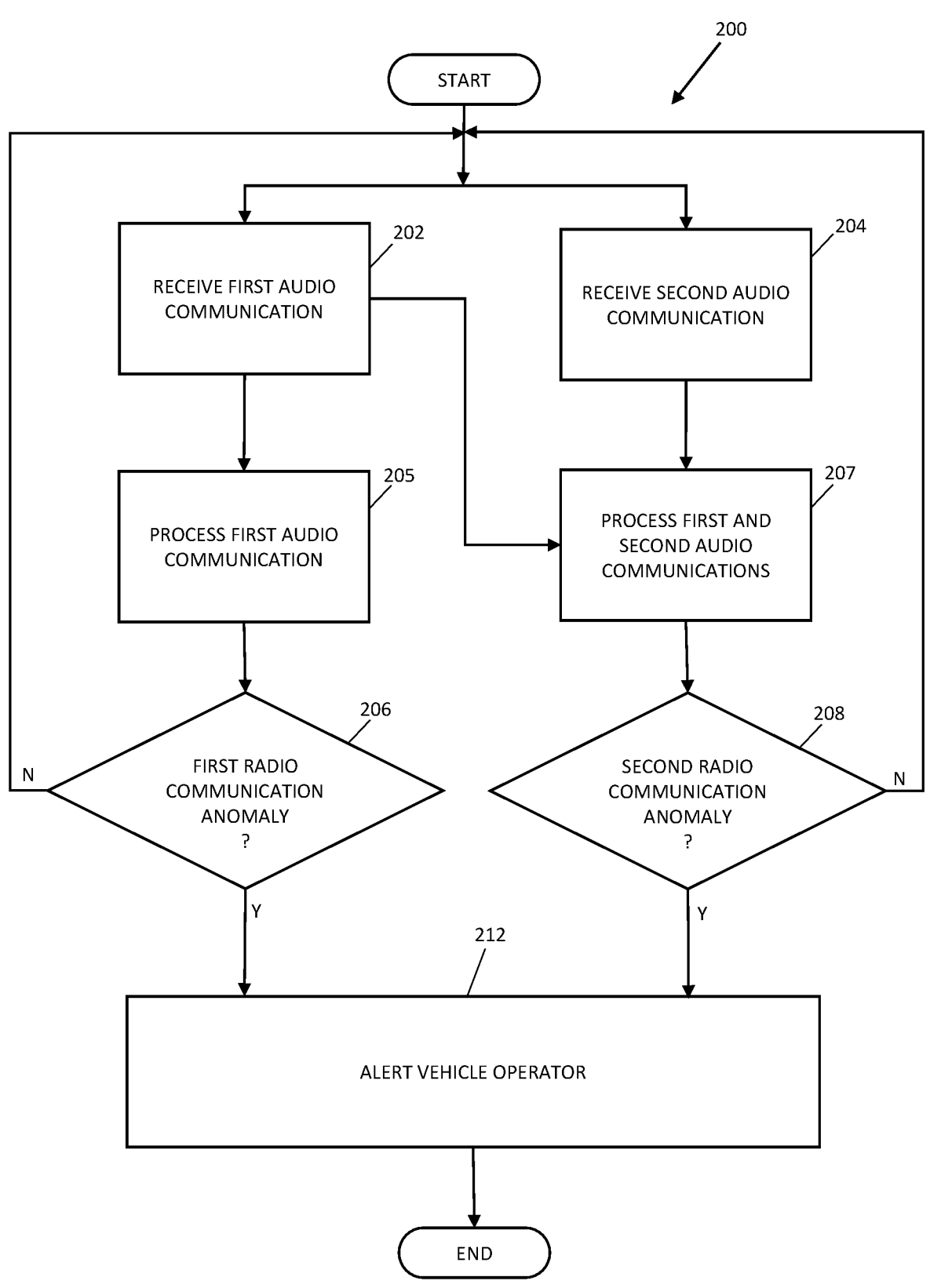
FIG. 2 depicts a process, in flowchart form, that may be implemented in the system of FIG. 1 for detecting and alerting about radio communication anomalies.

Having described the overall structure and function of the system 100 and its various components, the process implemented by the system 100 is depicted in flowchart form in FIG. 2, and with reference thereto will now be described.

The process 200 begins by receiving the first audio communication 112 (202) and the second audio communication 116 (204). As noted above, the first audio communication 112 is audio from a demodulated radio communication, and the second audio communication 116 is audio from a vehicle operator. The first audio communication 112 is processed (205), in the processing system 106, to determine when the first audio communication 112 is characteristic of the first radio communication anomaly (206). Simultaneously, the first and second audio communications 112, 116 are processed (207), in the processing system, to determine when first audio communication 112 and the second audio communication 116 are causing the second radio communication anomaly (208). If either the first radio communication anomaly or the second radio communication anomaly is occurring, the vehicle operator, via the alert generator 108, is alerted (212).

Figure 3:
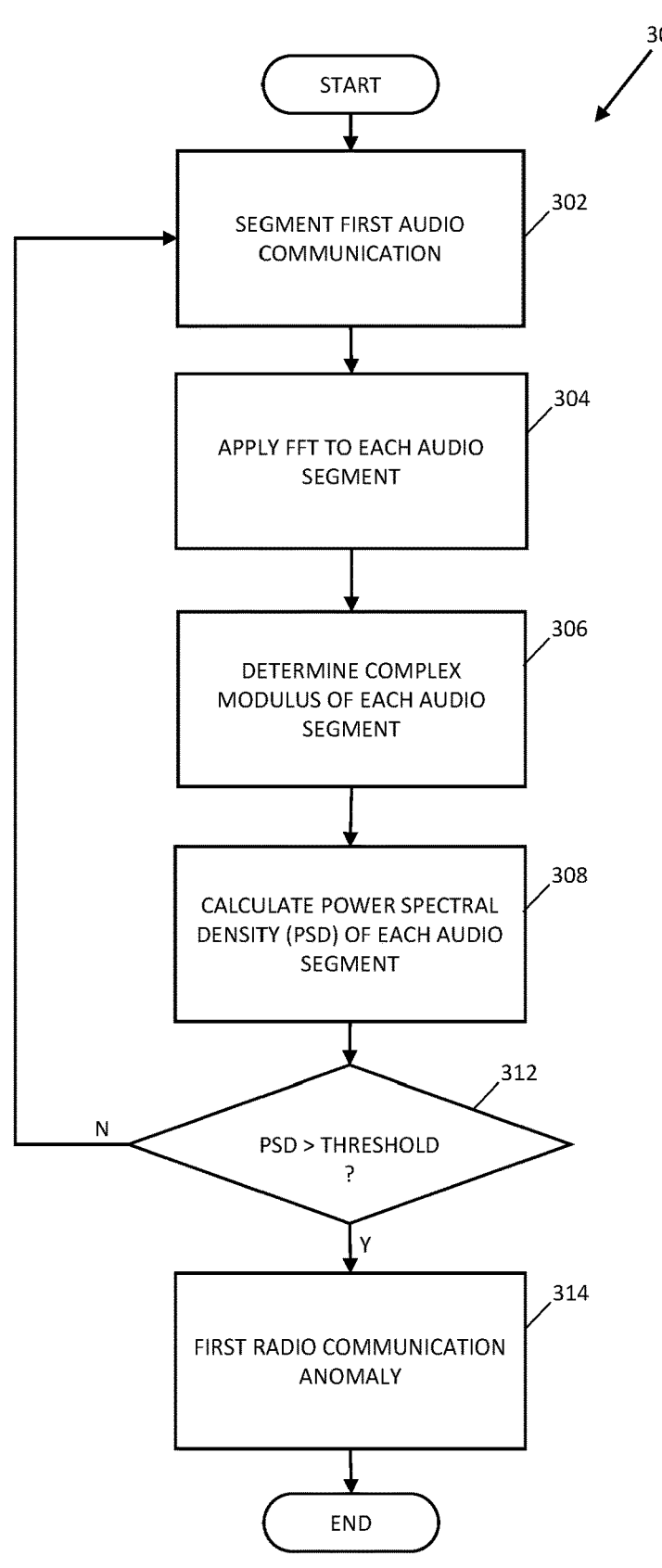
FIG. 3 depicts a process, in flowchart form, that may be implemented in the system of FIG. 1 for detecting that a first communication anomaly has occurred.

For completeness, the processes implemented in the processing system 106 for determining when the first or second radio communication anomaly are occurring are depicted in flowchart form in FIGS. 3 and 4, respectively, and will now be described beginning with FIG. 3.

The process 300 for determining when the first radio communication anomaly is occurring begins by segmenting the first audio communication 112 into a plurality of audio segments (302). The squeal detector module 118 then applies a Fast Fourier Transform (FFT) to each audio segment (304) and determines, from the FFT applied to each audio segment, the complex modulus of each audio segment (306). The squeal detector module 118 then calculates, using the complex modulus, the power spectral density of each audio segment (308). The power spectral density of each audio segment is then compared to a reference threshold (312). If the power spectral density of each audio segment exceeds the reference threshold, it is determined that the first radio communication anomaly has occurred (314).

Figure 4:
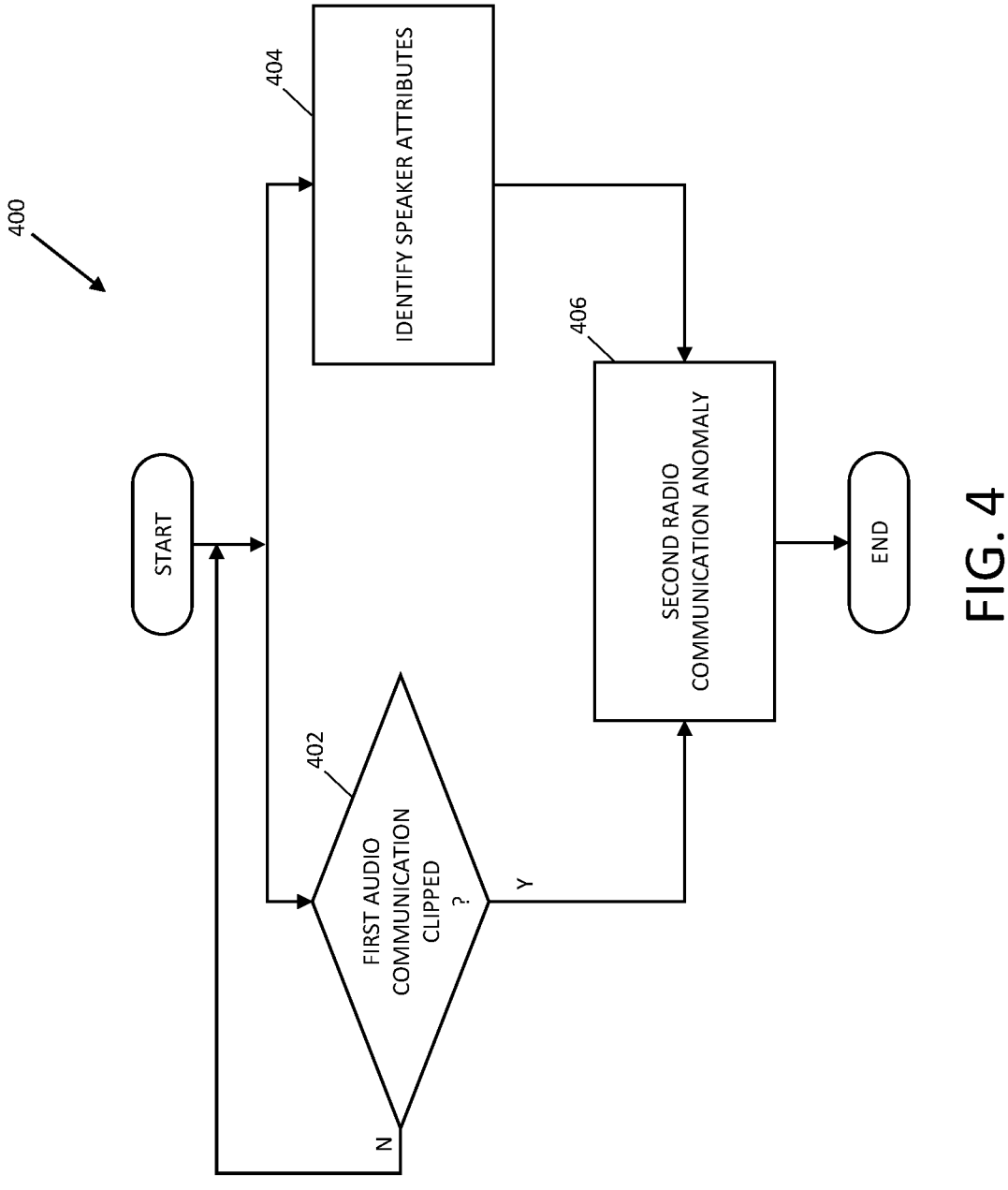
FIG. 4 depicts a process, in flowchart form, that may be implemented in the system of FIG. 1 for detecting that a second communication anomaly has occurred.

Turning now to FIG. 4, the process 400 for determining when second radio communication anomaly is occurring begins by analyzing, in the processing system, the first audio communication 112 to determine that the first audio communication is clipped (402). The above-described speaker diarization process is then implemented on the first and second audio communication 112, 116 to identify speaker attributes therein (404). When the first audio communication 112 is clipped and the speaker attributes are identified, it is determined that the second radio communication anomaly has occurred (406).

The system and methods described herein will detect overlapping radio transmissions and alert vehicle operators that such transmissions have occurred.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method to detect and alert about radio communication anomalies, comprising:

receiving, in a processing system, a first audio communication, the first audio communication being audio from a demodulated radio communication;

receiving, in the processing system, a second audio communication, the second audio communication being audio from a vehicle operator;

processing the first audio communication, in the processing system, to determine, from at least one audio characteristic, when the first audio communication is characteristic of a first radio communication anomaly;

processing the first audio communication and the second audio communication, in the processing system, to determine when the first audio communication and the second audio communication are causing a second radio communication anomaly; and alerting the vehicle operator, via an alert generator, when it is determined that either the first radio communication anomaly or the second radio communication anomaly occur, wherein step of processing the first audio communication and the second audio communication further comprises:

implementing, in the processing system, a channel separator to separate the first audio communication and the second audio communication into separate channels;

analyzing, in the processing system, the first audio communication to determine that the first audio communication is clipped;

implementing, in the processing system, a speaker diarization process on the second audio communication and the first audio communication to identify speaker attributes therein; and determining that the second radio communication anomaly has occurred when (i) the first audio communication is clipped and (ii) the speaker attributes are identified.

2. The method of claim 1, wherein the at least one audio characteristic includes a power spectral density of the demodulated audio communication.

3. The method of claim 2, wherein the step of processing the first audio communication comprises:

segmenting the first audio communication into a plurality of audio segments;

applying a Fast Fourier Transform (FFT) to each audio segment;

determining, from the FFT applied to each audio segment, a complex modulus of each audio segment; and calculating, using the complex modulus, the power spectral density of each audio segment.

4. The method of claim 3, further comprising:

comparing the power spectral density of each audio segment to a reference threshold to determine that the first radio communication anomaly occurred.

5. The method of claim 1, wherein the first radio communication anomaly is when the first audio communication and second audio communication overlap in a manner that completely blocks further processing of the first audio communication.

6. The method of claim 1, wherein the second radio communication anomaly is when the first audio communication and the second audio communication overlap in a manner that partially blocks further processing of the first audio communication.

7. The method of claim 1, wherein the alert generator alerts the operator by generating an audible alert, a visual alert, a haptic alert, or any combination thereof.

8. A system for detecting and alerting about radio communication anomalies, comprising:

an alert generator coupled to receive an alert signal and configured, upon receipt of the alert signal, to generate an alert; and a processing system in operable communication with the alert generator, the processing system configured, by programming instructions, to:

receive a first audio communication, the first audio communication being audio from a demodulated radio communication;

receive a second audio communication, the second audio communication being audio from a vehicle operator;

process the first audio communication to determine, from at least one audio characteristic, when the first audio communication is characteristic of a first radio communication anomaly;

process the first audio communication and the second audio communication to determine when the first audio communication and the second audio communication are causing a second radio communication anomaly; and generate and supply the alert signal to the alert generator when it is determined that either the first radio communication anomaly or the second radio communication anomaly occur, wherein the processing system is configured to process the first audio communication and the second audio communication by:

implementing, in the processing system, a channel separator module to separate the first audio communication and the second audio communication into separate channels;

analyzing, in the processing system, the first audio communication to determine that the first audio communication is clipped;

implementing, in the processing system, a speaker diarization process on the second audio communication and the first audio communication to identify speaker attributes therein; and determining that the second radio communication anomaly has occurred when (i) the first audio communication is clipped and (ii) the speaker attributes are identified.

9. The system of claim 8, wherein the at least one audio characteristic includes a power spectral density of the demodulated audio communication.

10. The system of claim 9, wherein the processing system is configured to process the first audio communication by:

segmenting the first audio communication into a plurality of audio segments;

applying a Fast Fourier Transform (FFT) to each audio segment;

determining, from the FFT applied to each audio segment, a complex modulus of each audio segment; and calculating, using the complex modulus, the power spectral density of each audio segment.

11. The system of claim 10, wherein the processing system is further configured to:

compare the power spectral density of each audio segment to a reference threshold to determine that the first radio communication anomaly occurred.

12. The system of claim 8, wherein the first radio communication anomaly is when the first audio communication and second audio communication overlap in a manner that completely blocks further processing of the first audio communication.

13. The system of claim 8, wherein the second radio communication anomaly is when the first audio communication and the second audio communication overlap in a manner that partially blocks further processing of the first audio communication.

14. The system of claim 8, wherein the alert generator is configured to alert the operator by generating an audible alert, a visual alert, a haptic alert, or any combination thereof.

15. A system for detecting and alerting about radio communication anomalies, comprising:
  an alert generator coupled to receive an alert signal and configured, upon receipt of the alert signal, to generate an alert;
  a radio receiver configured to receive and demodulate a transmitted radio communication to thereby supply a first audio communication;
  a microphone configured to receive audio from a vehicle operator and supply a second audio communication; and
  a processing system in operable communication with the alert generator, the radio receive, and the microphone, the processing system configured, by programming instructions, to:
    receive the first audio communication;
    receive the second audio communication;
    process the first audio communication to determine, from at least one audio characteristic, when the first audio communication is characteristic of a first radio communication anomaly;
    process the first audio communication and the second audio communication to determine when the first audio communication and the second audio communication are causing a second radio communication anomaly; and
    generate and supply the alert signal to the alert generator when it is determined that either the first radio communication anomaly or the second radio communication anomaly occur,
  wherein the processing system is configured to process the first audio communication and the second audio communication by:
    implementing, in the processing system, a channel separator module to separate the first audio communication and the second audio communication into separate channels;
    analyzing, in the processing system, the first audio communication to determine that the first audio communication is clipped;
    implementing, in the processing system, a speaker diarization process on the second audio communication and the first audio communication to identify speaker attributes therein; and
    determining that the second radio communication anomaly has occurred when (i) the first audio communication is clipped and (ii) the speaker attributes are identified.

16. The system of claim 15, wherein the at least one audio characteristic includes a power spectral density of the demodulated audio communication, and wherein the processing system is configured to process the first audio communication by:
  segmenting the first audio communication into a plurality of audio segments;
  applying a Fast Fourier Transform (FFT) to each audio segment;
  determining, from the FFT applied to each audio segment, a complex modulus of each audio segment;
  calculating, using the complex modulus, the power spectral density of each audio segment; and
  compare the power spectral density of each audio segment to a reference threshold to determine that the first radio communication anomaly occurred.

17. The system of claim 15, wherein:
  the first radio communication anomaly is when the first audio communication and second audio communication overlap in a manner that completely blocks further processing of the first audio communication; and
  the second radio communication anomaly is when the first audio communication and the second audio communication overlap in a manner that partially blocks further processing of the first audio communication.

* * * * *